US006792480B2

(12) United States Patent
Chaiken et al.

(10) Patent No.: US 6,792,480 B2
(45) Date of Patent: *Sep. 14, 2004

(54) STATUS DISPLAY BEING VISIBLE IN A CLOSED POSITION AND DISPLAYING A TRACK NUMBER DURING PLAY MODE COMPRISING A REDUCED POWER OF A SYSTEM

(75) Inventors: Craig L. Chaiken, Tomball, TX (US); Tim L. Zhang, Spring, TX (US); James L. Mondshine, Cypress, TX (US); Daniel V. Forlenza, Cypress, TX (US); Mark J. Schlaffer, Pinehurst, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/126,465

(22) Filed: Apr. 17, 2002

(65) Prior Publication Data

US 2002/0178305 A1 Nov. 28, 2002

Related U.S. Application Data

(63) Continuation of application No. 09/627,280, filed on Jul. 28, 2000, now Pat. No. 6,393,499, which is a continuation of application No. 09/514,839, filed on Feb. 28, 2000, now Pat. No. 6,195,713, which is a division of application No. 08/990,551, filed on Dec. 15, 1997, now Pat. No. 6,116,767, which is a continuation-in-part of application No. 08/846,641, filed on Apr. 30, 1997, now Pat. No. 6,006,285.

(51) Int. Cl.[7] .............................................. G06F 3/00
(52) U.S. Cl. ........................... 710/14; 710/18; 710/19; 710/8; 713/324; 713/320; 361/683
(58) Field of Search .................. 369/2, 41.01; 710/8, 710/14, 15, 19, 8.14, 18; 713/320, 324; 361/683

(56) References Cited

U.S. PATENT DOCUMENTS

| 4,149,043 A | 4/1979 | Itoh et al. |
| 4,497,021 A | 1/1985 | Fukuda et al. |
| 4,852,073 A | 7/1989 | Shinohara et al. |
| 4,898,483 A | 2/1990 | Iizuka |
| 4,926,373 A | 5/1990 | Takenaka |
| 5,138,600 A | 8/1992 | Aoyagi |
| 5,262,940 A | 11/1993 | Sussman |
| 5,377,358 A | 12/1994 | Nakamura |

(List continued on next page.)

FOREIGN PATENT DOCUMENTS

| EP | 0564092 A2 | 10/1993 |
| EP | 0588084 A2 | 3/1994 |
| JP | A-09-1848 | 4/1997 |
| JP | 9-101848 | 4/1997 |
| JP | 9-101848 A * | 4/1997 |

OTHER PUBLICATIONS

Intel486™ SL Microprocessor SuperSet Programmer's Reference Manual, Intl Corp., Nov. 1992, pp. 6–29 through 6–53.

(List continued on next page.)

Primary Examiner—Ilwoo Park

(57) ABSTRACT

A computer system incorporating capabilities for displaying the audio disk track number when the computer system is playing an audio disk. The computer system determines if a disk is present in the disk drive. If a disk is present, the computer system determines if an audio disk is present in the disk drive. If so, the computer system then monitors the disk drive. When the audio disk is played by the disk drive, the computer system displays the audio disk track number. The computer system then periodically polls the disk drive to update the audio disk track number. The computer system displays a battery gauge status when the audio disk track number is not being displayed. The status display is visible when the portable computer is in either an open or closed state.

22 Claims, 7 Drawing Sheets

U.S. PATENT DOCUMENTS

| | | | |
|---|---|---|---|
| 5,404,546 A | | 4/1995 | Stewart |
| 5,434,508 A | | 7/1995 | Ishida |
| 5,477,129 A | | 12/1995 | Myslinski |
| 5,560,024 A | | 9/1996 | Harper et al. |
| 5,579,524 A | | 11/1996 | Kikinis |
| 5,592,640 A | | 1/1997 | Minoura |
| 5,603,040 A | | 2/1997 | Frager et al. |
| 5,617,571 A | | 4/1997 | Tanaka |
| 5,630,144 A | | 5/1997 | Woog et al. |
| 5,631,882 A | | 5/1997 | Mascenik |
| 5,632,037 A | | 5/1997 | Maher et al. |
| 5,657,445 A | | 8/1997 | Pearce |
| 5,712,949 A | * | 1/1998 | Kato et al. .................. 386/96 |
| 5,745,772 A | | 4/1998 | Klein |
| 5,764,476 A | * | 6/1998 | Ohgami et al. ............ 361/683 |
| 5,768,164 A | | 6/1998 | Hollon, Jr. |
| 5,796,984 A | | 8/1998 | Pearce et al. |
| 5,809,449 A | | 9/1998 | Harper |
| 5,815,679 A | | 9/1998 | Liu |
| 5,822,598 A | | 10/1998 | Lam |
| 5,838,983 A | | 11/1998 | Atkinson |
| 5,850,560 A | | 12/1998 | Kang |
| 5,892,502 A | | 4/1999 | Hiller |
| 5,898,600 A | | 4/1999 | Isashi |
| 5,910,933 A | * | 6/1999 | Moore ........................ 369/2 |
| 5,964,878 A | | 10/1999 | Ryu |
| 6,006,285 A | | 12/1999 | Jacobs et al. |
| 6,006,337 A | | 12/1999 | Koo |
| 6,073,187 A | | 6/2000 | Jacobs et al. |
| 6,116,767 A | * | 9/2000 | Chaiken et al. ............. 345/169 |
| 6,195,713 B1 | * | 2/2001 | Chaiken et al. .......... 369/41.01 |
| 6,393,499 B1 | * | 5/2002 | Chaiken et al. ............... 710/19 |

OTHER PUBLICATIONS

Enhanced IDE 95/96 Guide, Western Digital, Mar. 17, 1995, pp. 17 through 42.

Pentium™ Processor User's Manual vol. 3: Architecture and Programming Manual, Intel Corp., 1994, 20–1 through 20–9.

The Computer Desktop Encyclopedia, Alan Freedman, 1996, pp. 47, 226, 258, 479–480.

Intel48™ SL Microprocessor SuperSEt Programmer's Reference Manual, Intel Corp., Nov. 1992.

* cited by examiner

STATUS DISPLAY BEING VISIBLE IN A CLOSED POSITION AND DISPLAYING A TRACK NUMBER DURING PLAY MODE COMPRISING A REDUCED POWER OF A SYSTEM

CROSS-REFERENCE TO RELATED APPLICATIONS

This application is a continuation of U.S. patent application Ser. No. 09/627,280, filed Jul. 28, 2000, now U.S. Pat. No. 6,393,499 which is a continuation of U.S. patent application Ser. No. 09/514,839, filed Feb. 28, 2000, issued as U.S. Pat. No. 6,195,713 on Feb. 27, 2001, which is divisional of U.S. patent application Ser. No. 08/990,551, filed Dec. 15, 1997, issued as U.S. Pat. No. 6,116,767 which is a continuation-in-part of U.S. patent application Ser. No. 08/846,641, filed on Apr. 30, 1997, issued as U.S. Pat. No. 6,006,285 on Dec. 21, 1999, which are hereby incorporated by reference.

STATEMENTS REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Field of the Invention

The present invention relates to displaying Compact Disk (CD) status information on a computer, and more specifically to displaying the CD track being played in the CD-ROM drive of a notebook computer.

2. Description of the Related Art

Operating a CD-ROM drive in a computer system has required booting an operating system and loading and utilizing a CD-ROM drive application. The RAM-based CD-ROM device driver of the CD-ROM drive application allowed for operation of the CD-ROM drive. The lengthy duration of the booting process for an operating system and the considerable user interaction required by a CD-ROM drive application render playing an audio CD in the CD-ROM drive of a computer system, as opposed to in a conventional audio CD player, undesirable. An audio CD player, unlike a CD-ROM drive of a computer system, does not involve a timely initialization process and substantial user interaction. As such, despite the CD-ROM drive present in conventional computer systems, users have maintained a separate audio CD player in place of the portable computer. In addition, where a user is away from his or her audio CD player, a conventional computer system due to its initialization and user interaction requirements is unsuited to playing an audio CD as quickly and easily as allowed by a conventional audio CD player. Because of the initialization process and user interaction required, portable computer users would often carry a separate audio CD player for music listening even though the portable computer had music playing capability. Also, since a CD-ROM drive application was dependent upon an operating system, it was necessary to use a display screen to visually indicate to the user when a CD-ROM drive application was being operated. As such, portable computer users have been required to maintain the portable computer case containing a portable computer in its open state to determine the status of a CD-ROM drive application, including CD track information.

Further, a conventional computer system has required a user to access numerous locations, software and hardware, to obtain status and to adjust the volume and other settings of various audio sources such as a CD, wave, and synthesizer for music listening. These locations typically include a mixer in a Windows®-based CD-ROM drive application for controlling the volume of audio sources, a software master volume control in a Windows® task bar, and a hardware volume thumbwheel. As these volume control sources controlled volume independent of each other, it was necessary for a user to sort through cumbersome CD-ROM drive software to adjust the volume of the appropriate audio sources. In light of the software nature of certain volume controls, it was also necessary to maintain the portable computer case in its open state with the display screen visible to a user to allow for certain volume adjustments during music listening.

BRIEF SUMMARY OF THE INVENTION

A computer system according to the invention that displays the audio disk track number when the computer system is playing an audio disk. The computer system determines if an audio disk is present in the disk drive. If an audio disk is present, the computer system periodically polls the disk drive to determine if the audio disk is being played. If an audio disk is being played, the computer system displays the audio disk track number. The computer system then periodically polls the disk drive to update the audio disk track number. If an audio disk is not being played, the computer system displays the battery gauge (or other) information in the position the audio track number is displayed. In the disclosed embodiment, the track information is visible when the lid is in the closed position, allowing the audio disk track number display to be seen without opening the lid.

BRIEF DESCRIPTION OF THE SEVERAL VIEWS OF THE DRAWINGS

A better understanding of the present invention can be obtained when the following detailed description of the preferred embodiment is considered in conjunction with the following drawings, in which.

DETAILED DESCRIPTION OF THE INVENTION

The following disclosures are hereby incorporated by reference:

U.S. Pat. No. 6,006,285, filed on Apr. 30, 1997, entitled "COMPUTER SYSTEM CAPABLE OF PLAYING AUDIO CDS IN A CD-ROM DRIVE INDEPENDENT OF AN OPERATING SYSTEM," to William E. Jacobs, Dan V. Forlenza, James L. Mondshine, Tim L. Zhang, Greg B. Memo, Kevin R. Frost, and Lonnie J. Pope; and U.S. Pat. No. 6,252,511, filed on Jun. 20, 1997, entitled "REAL-TIME BATTERY GAUGE DISPLAY," to Luke L. Mondshine, Dan V. Forlenza, Kevin R. Frost, and Greg B. Memo; both of which are assigned to the assignee of this invention.

Figure 1:
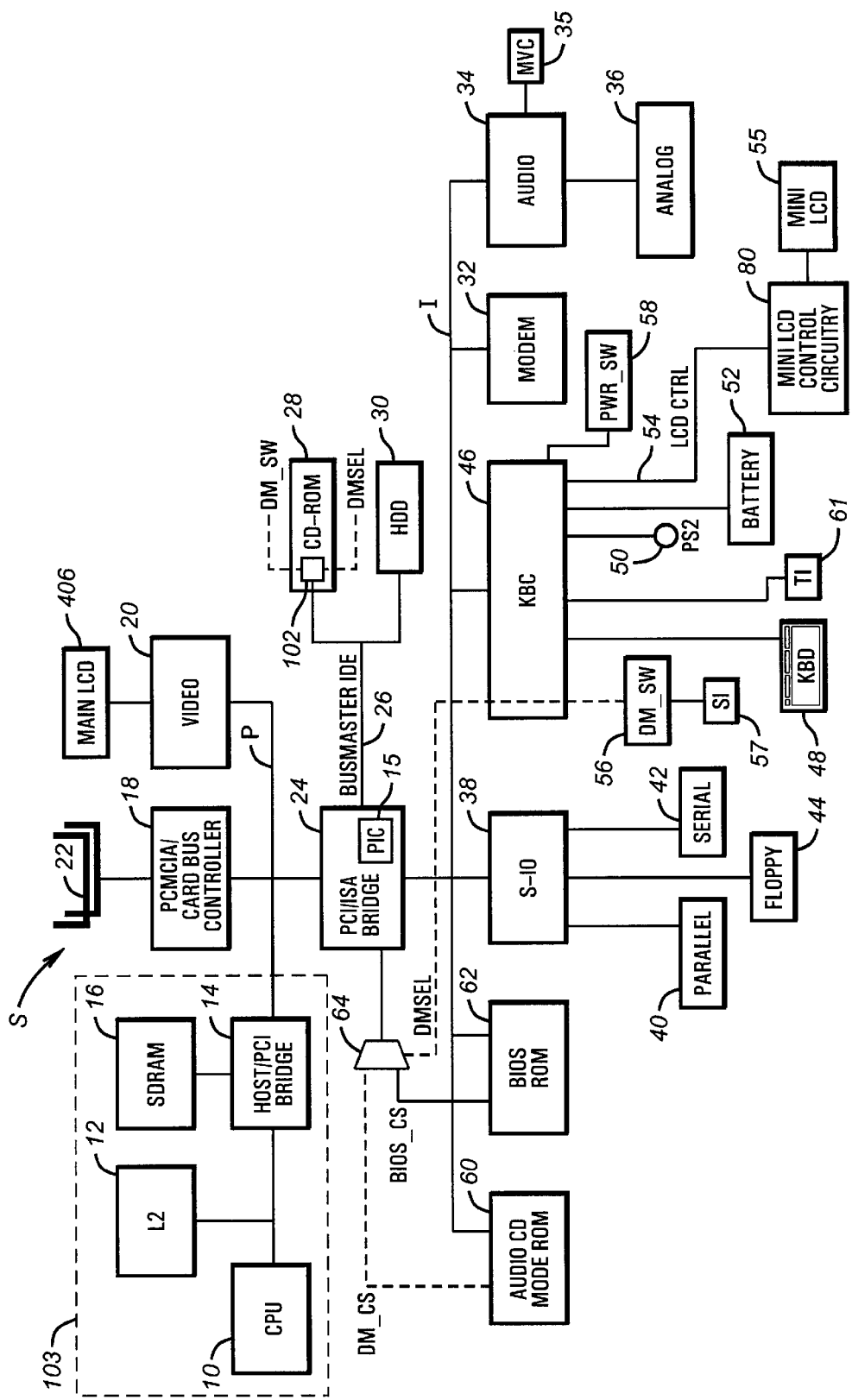
FIG. 1 is a schematic diagram of a portable computer system showing an audio CD mode ROM, audio CD mode switch, status indicator, and master volume control buttons of the present invention.

Turning to FIG. 1, a schematic diagram of a portable computer system S of the present invention is shown. Within the portable computer S, a CPU 10 and a Level 2 (L2) cache 12 are connected. The processor 10 is preferably a Pentium® processor manufactured by Intel Corporation of Santa Clara, Calif. The processor 10 operates preferably with a standard IBM-PC compatible operating system, such as Windows® 95, available from MicroSoft Corporation of Redmond, Wash. The L2 cache 12 provides additional caching capabilities to the processor's on-chip cache to improve performance.

Figure 4:
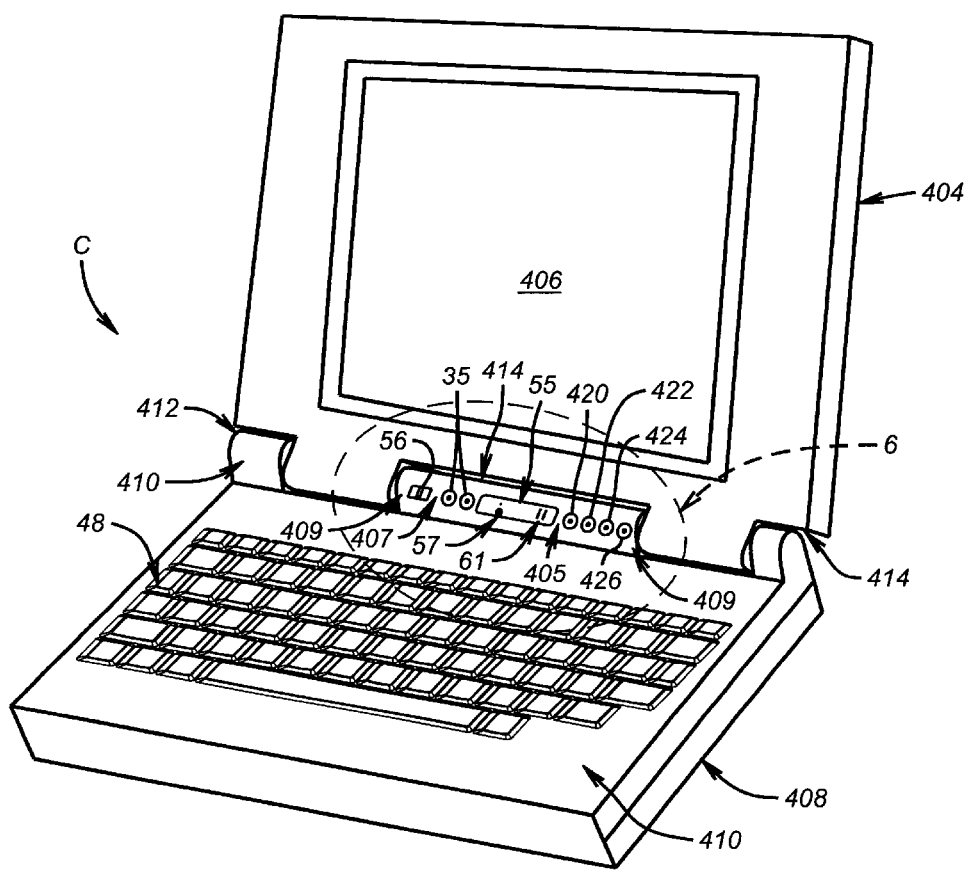
FIG. 4 is an isometric view of a portable computer case containing the computer system of FIG. 1 in an open state in accordance with the present invention.

The CPU 10 and the L2 cache 12 are connected to a host/PCI bridge 14. Also connected to the host/PCI bridge 14 is a synchronous DRAM 16. The host/PCI bridge 14 is further coupled to a PCI bus P that connects to a PCMCIA/CardBus controller 18 and a video card 20 including a video graphics controller and video memory. The video graphics controller of card 20 provides control signals to the main liquid crystal display screen 406 (FIGS. 1 and 4). The PCMCIA/CardBus controller 18 is also coupled to a set of PCMCIA cards 22 for connecting a variety of peripherals to the portable computer S.

A PCI/ISA bridge 24 is used to connect the PCI bus P and an ISA bus I. Coupled to the PCI/ISA bridge 24 is an IDE interface 26 which connects to a CD-ROM drive 28 having an IDE controller and to a hard disk drive 30. The IDE interface 26 is preferably a busmaster and an IDE/ATA interface having enhanced IDE features. The CD-ROM drive 28 is preferably compliant with ATAPI (AT Attachment Packet Interface), the IDE standard for CD-ROM drives, and includes a CD-ROM drive controller 102 that is preferably embedded in the CD-ROM drive 28. Also, integrated in the PCI/ISA bridge 24 is a set of programmable interrupt controllers (PICs) 15 for managing hardware interrupts according to their priority. The PICs 15 preferably includes two cascaded PICs for allowing interrupt channels IRQØ–IRQ15.

Numerous chips, which may be integrated into the PCI/ISA bridge 24, are coupled to the ISA bus I. Both a modem 32 and an audio or sound chip 34 are coupled to the ISA bus I. The sound chip 34 is further coupled to an acoustic output device 36 for outputting analog signals such as a set of speakers of the computer system S or an external stereo system. The speakers 36 are preferably audible while the portable computer case S is in a closed state. In addition, the sound board 34 is coupled to the digital master volume control buttons 35. Also, a S-IO chip 38 is coupled to the ISA bus I. The S-IO chip 38 provides a parallel port 40, a serial port 42, and connects to a floppy disk drive 44. To more clearly illustrate the features and operation of the present invention, certain other conventional computer devices and systems not directly involved in the present invention are not shown.

A keyboard controller 46 is also coupled to the ISA bus I. The keyboard controller 46 typically connects to a keyboard 48, a PS/2 port 50, a battery 52, mini LCD control circuitry 810 according to the present invention (FIG. 8) for providing control signals to a mini LCD screen 55, and a power switch PWR_SW 58.

As discussed in greater detail below in conjunction with FIG. 3, a mini LCD screen 55 according to the present invention provides a track indicator 61 for indicating which track is being played in the CD-ROM drive 28. The mini LCD screen 55 may also provide a battery gauge display, such as that disclosed in the previously incorporated U.S. patent entitled "REAL-TIME BATTERY GAUGE DISPLAY."

The keyboard controller 46 of the present invention includes system management interrupt (SMI) circuitry for generating system management interrupts. Certain processors, such as the Pentium® processor, have included a mode referred to as a system management mode (SMM) which is entered upon receipt of a system management interrupt. An SMI is the software interrupt with the highest priority, and is operating system independent. Generation of an SMI also causes synchronous execution of an SMI handler, which is typically located in a protected memory address space of the synchronous DRAM 16 or other system memory. An SMI handler is an interrupt service routine for performing specific system management tasks, like reducing power to specific devices or providing security services. SMI handler code thus may be written by one of ordinary skill in the art to perform a variety of system management tasks.

In a "keyboard controller" embodiment of the present invention, the keyboard controller 46 is further coupled to an audio CD mode switch DM_SW 56 and also receives the audio CD select signal DMSEL. In a "CD-ROM drive controller" embodiment of the present invention, the CD-ROM drive controller 102 is coupled to the audio CD mode switch DM_SW 56 and receives the audio CD select signal DMSEL. If the power switch PWR_SW 58 of the computer system S is in an "on" state, the audio CD mode switch DM_SW 56 is disabled such that toggling of audio CD mode switch DM_SW 56 has no effect. The audio CD mode switch DM_SW 56 is also disabled when the computer system S in a sleep mode. If the power switch PWR_SW 58 of the computer system S is in an "off" state such as a hibernate mode, the audio CD mode switch DM_SW 56 is enabled.

When the audio CD mode switch DM_SW 56 is enabled, the state of the switch 56 determines whether the computer system S is in an audio CD mode. The audio CD mode switch DM_SW 56, when placed in an "on" state, serves to place the computer system S of the present invention in an audio CD mode. Audio CD mode is a secondary operational mode which enables the computer system S of the present invention to bypass traditional system BIOS and play audio CDs in a CD-ROM drive 28 without running an operating system. For further details, reference is made to the co-pending application entitled "COMPUTER SYSTEM CAPABLE OF PLAYING AUDIO CDS IN A CD-ROM DRIVE INDEPENDENT OF AN OPERATING SYSTEM," previously incorporated above. Also in the disclosed embodiment, a status indicator 57 (FIG. 4) is provided on the mini LCD screen 55 for indicating when the computer system S is in an audio CD mode and is playing an audio CD.

When the power switch PWR_SW 58 of the computer system S of the present invention is placed in an "on" state while the audio CD mode switch DM_SW 56 is in an "off" state such that the computer system S is in a PC or primary operational mode, the operating system of the computer proceeds to access and execute the system BIOS in the BIOS ROM. Executing system BIOS code results in a lengthy booting process wherein a power-on-self-test (POST) is performed on the system hardware in the computer system. In order to operate a CD-ROM drive in a conventional computer, an operating system must be loaded and a CD-ROM drive application initiated such that the device driver of the CD-ROM drive application serves as the interface between the CD-ROM drive and the operating system. The initiation of a CD-ROM application requires significant user interaction such as popping up windows and clicking on various portions of a computer screen.

Contrastingly, the computer system S of the present invention is capable of avoiding the lengthy boot process associated with contemporary BIOS ROM and the significant user interaction associated with a contemporary CD-ROM drive application by providing an audio CD mode. For the keyboard controller embodiment of the present invention, when the computer system S enters an audio CD mode, the processor-memory subsystem 103, the PCI/ISA bridge 24, the CD-ROM drive 28, the host/PCI bridge 14, the audio CD mode ROM 60, and the keyboard controller 46 are powered. ROM-based code including code for processing CD button selections is then loaded from an alternate ROM device, the audio CD mode ROM 60, instead of a conventional BIOS ROM device 62. An operating system is not loaded, thereby significantly reducing the duration of the system initialization.

Rather than using a ROM device for conventional BIOS code and a separate ROM device for the audio CD code of the present invention, the present invention may also be achieved by using a single ROM device. The single ROM device includes a memory address range for conventional BIOS code and a memory address range for audio CD code 200 of the present invention. If the audio CD select signal DMSEL is unasserted, a memory address range for conventional BIOS code is selected. If the audio CD select signal DMSEL is asserted, a memory address range for audio CD code 200 of the present invention is selected. Preferably, the conventional BIOS code and the audio CD code 200 share common code such as POST code. Also, the firmware in the audio CD mode ROM 60 region is preferably shadowed in the system DRAM 16 to accelerate BIOS accesses.

For the CD-ROM drive controller embodiment of the present invention, when the computer system S enters an audio CD mode, the CD-ROM drive 28 and the CD-ROM drive controller 102 are powered. While code is loaded from an alternate ROM region for the keyboard controller embodiment, the CD-ROM drive controller embodiment does not require embedded code in an alternate ROM region to process CD button selections. Rather, a CD-ROM drive controller 102 may directly provide CD button selections to a CD-ROM drive 28. Although use of a ROM region is described for both embodiments, the present invention extends to other non-volatile memory types.

Further, when the keyboard controller embodiment of the computer system S is placed in an audio CD mode, an audio CD select signal DMSEL is asserted and directed to a multiplexer 64. The multiplexer 64 receiving the audio CD select signal DMSEL is coupled to or integrated into the PCI/ISA bridge 24. If the audio CD select signal DMSEL is unasserted, the multiplexer 64 selects the contemporary BIOS ROM 62 by asserting a BIOS control signal, BIOS_CS. If the audio CD select signal DMSEL is asserted, the multiplexer 64 selects the audio CD mode ROM 60 of the present invention by asserting an audio CD control signal, DM_CS.

Figure 2:
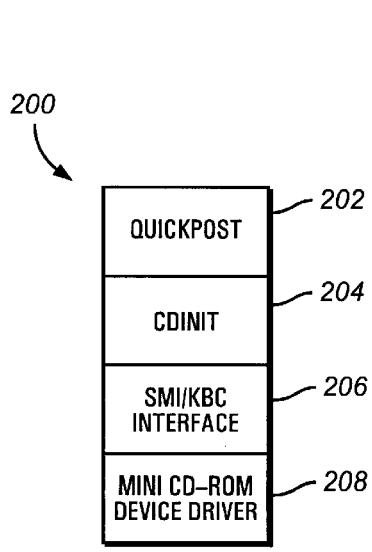
FIG. 2 is a diagram of the firmware code in the audio CD mode ROM of FIG. 1 for a keyboard controller embodiment of the present invention.

Referring to FIG. 2, a diagram of the audio CD firmware code 200 in the audio CD mode ROM 60 is shown. The firmware 200 includes a mini-version of a power-on-self-test termed quick POST 202, a mini CD-ROM device driver 208, an SMI-keyboard controller interface 206, and CD INIT 204, the initialization code for the mini CD-ROM device driver 208. While a conventional CD-ROM device driver in CD-ROM applications is RAM-based, the mini CD-ROM device driver 208 in the audio CD mode ROM 60 is based on a non-volatile memory such as read-only-memory (ROM). Also, while the CD-ROM device driver in a conventional CD-ROM application must allow for playing of audio and data CDs, the mini CD-ROM device driver 208 in the audio CD mode ROM 60 allows for playing audio CDs, not data CDs, thereby requiring less code and reducing the execution time for the device driver code. If a non-audio CD is present in the CD-ROM drive 28, the audio CD code opens the door of the CD-ROM drive 28 and generates a beep to signal to the user that a non-audio CD is present in the CD-ROM drive 28.

In an audio CD mode, a CD button selection is fetched by a keyboard controller 46 in a keyboard controller embodiment of the present invention. A CD button selection, such as a track selection, generates an SMI thereby executing the SMI handler code. The SMI-keyboard controller interface firmware 206 is used to pass control from the keyboard controller 46 to the SMI handler. The SMI handler places a keycode which is preferably a bezel button variable corresponding to the selected CD button in a memory area termed a keycode cache. The keycode cache is preferably located in an extended BIOS data area segment of the SDRAM 16. The SMI handler is also used to generate a non-maskable interrupt (NMI) which calls the mini CD-ROM device driver 208.

In the present invention, a NMI indicates that a bezel button variable corresponding to a selected CD button is ready to be fetched by the mini CD-ROM device driver 208. The mini CD-ROM device driver 208, which is preferably a bezel button driver, fetches the bezel button variable from the keycode cache. The mini CD-ROM device driver 208 then transmits a CD packet command corresponding to the bezel button variable to the CD-ROM drive 28. The CD packet command is preferably a simplified version of a Small Computer System Interface (SCSI) command and is used with an ATAPI packet command protocol. The CD-ROM drive 28 then issues an interrupt request (IRQ) which informs the processor 10 that the CD-ROM drive 28 is ready for execution of the CD packet command. Lastly, the CPU 10 executes the CD packet command. The quick POST firmware 202 performs the necessary initialization for the audio CD mode of the computer system S. For instance, the quick POST firmware 202 may test for shadow ROM areas, initialize configuration registers, power on the CD-ROM drive 28, power off the hard disk drive 30, power down the PCMCIA CardBus controller 18, and initialize the audio chip 34.

A conventional computer system has required a user to access numerous locations, software and hardware, to adjust audio tracks or to adjust the volumes of various audio sources such as a CD, wave, and synthesizer for music listening. These locations typically include a mixer in a Windows CD-ROM drive application for controlling the volume of audio sources and selecting tracks, a software master volume control in a Windows task bar, and a hardware volume thumbwheel. As these volume control sources controlled volume independent of each other, it was necessary for a user to sort through cumbersome CD-ROM drive software to adjust the volume of the appropriate audio sources. In light of the software nature of certain volume controls, it was also necessary to maintain the portable computer case in an open state with the display screen visible to a user to allow for certain volume adjustments during music listening or allow for track changes.

In the present invention, the master volume control buttons 35 allowing for a single source of volume control which is accessible while the portable computer case C is in a closed state. The master volume control buttons 35 are digital and are preferably connected directly to the audio chip 34. The volume up button and the volume down button of the master volume control buttons 35 are hardwired inputs to the audio chip 34.

Figure 10:
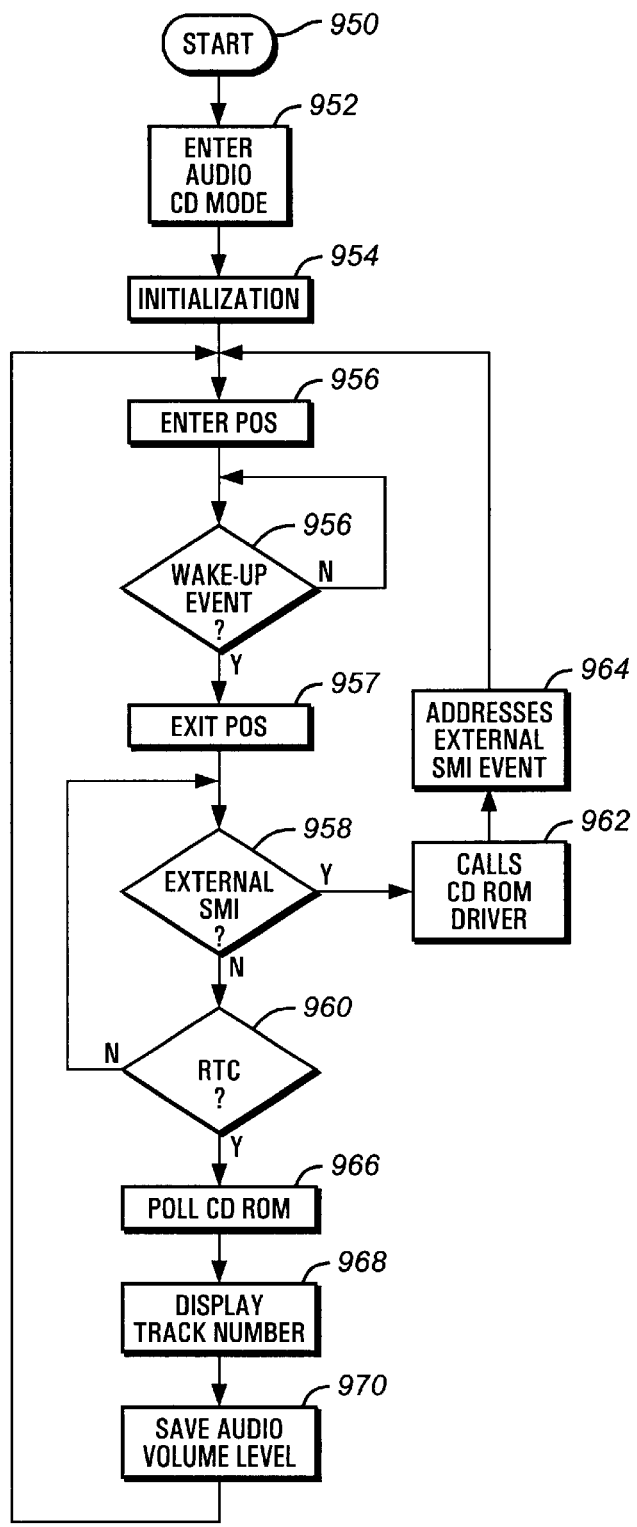
FIG. 10 is a flow chart of an alternative embodiment of the audio CD mode process in accordance with the present invention.

Turning to FIG. 10, a flow chart of an alternate embodiment of the audio CD mode process in shown. The procedure commences with step 950. In step 952, the computer system S enters the audio CD mode The precise implementation for entering the audio CD mode is not considered critical to the present invention nor is the manner in which the audio CD is selected for play. In the disclosed embodiment the audio CD, if present, is automatically played upon entry into the audio CD mode. Next, the computer system S is initialized in step 954. In step 955, the computer system S enters the Power-On-Suspend (POS) mode. In the POS mode, the processor 10 clock is stopped. In this embodiment of the invention, the computer system S remains in the POS mode until one of two wake-up events occur. The first wake-up event occurs when an external SMI is generated. The second wake-up event occurs every 500 msec when the Real Time Clock (RTC) generates a periodic signal. The computer system determines if a wakeup event has occurred in step 956. If no wake-up event is detected, the computer system continually loops at this step until a wake-up event occurs. If the computer system experiences a wake-up event, the computer system exits the POS mode in step 957. Once the computer system S has wakened, the processor 10 begins checking for either an external SMI status or a RTC periodic signal.

Specifically, the processor 10 in step 958 determines if the external SMI status signal reflects an external SMI. An external SMI is generated by the keyboard controller 46 when a CD button selection occurs. This functions as a wake-up event as well as a CD button selection. The ISA Bridge 24 is implemented to disable the SMI generator, so upon receipt of an external SMI signal, an SMI is not generated. However, the ISA Bridge 24 sets a hardwired external SMI status signal upon receipt of the external SMI. If the external SMI status signal shows an external SMI was generated by the keyboard controller 46, the processor 10, in step 962, calls the CD-ROM driver. The CD-ROM driver, in step 964, addresses the SMI event, such as a track button selection, before the computer system S returns to the POS mode in step 955. If the external SMI status signal does not show an external SMI, the processor 10 determines if the RTC has generated the aforementioned 500 msec periodic signal in step 960. If the RTC has not generated the 500 msec periodic signal, then the processor returns to step 958.

If the 500 msec period signal is detected in step 962, the processor 10 proceeds to step 966 and polls the CD-ROM for status information such as the current track being played. The processor 10 displays the track number if the track number has changed since the last track number displayed in step 968. Details of this step are provided in FIG. 3. The process then proceeds to step 970 and saves the current audio volume level to non-volatile RAM, such as Complementary Metal Oxide Semiconductor (CMOS) memory. The saved audio volume level is retrieved upon the next entry into the audio CD mode. The process then returns to step 955 and re-enters POS mode. The disclosed embodiment shows a 500 msec periodic signal. However, according to the techniques of the invention, a wide variety of periods could be implemented.

Figure 3:
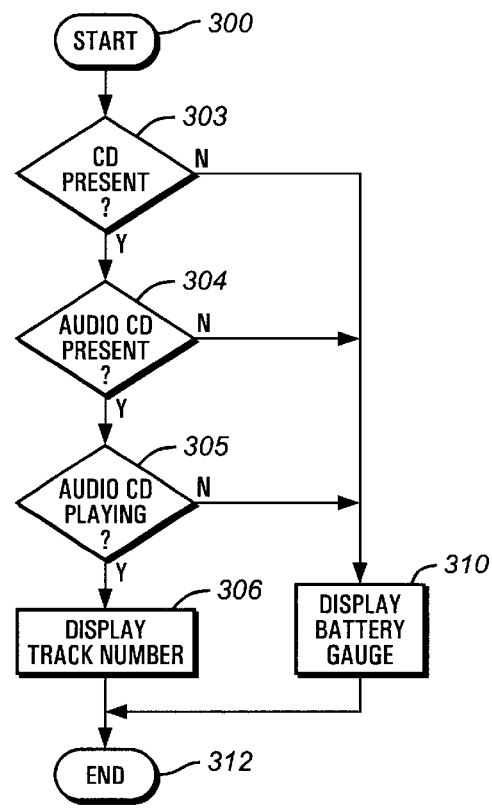
FIG. 3 is a flow chart of a process according to the present invention for displaying the audio disk track number on the mini LCD of FIG. 1.

Referring to FIG. 3, the process for displaying the audio disk track number (step 968 of FIG. 10) on the mini LCD is shown. The process starts with step 300. In step 303, the computer system S determines if a CD-ROM is present in the CD-ROM drive 28. If no CD-ROM is present, the computer system S proceeds to step 310 and displays the battery gauge status before ending the process in step 312. If a CD-ROM is present in step 303, the computer system proceeds to step 304 where the computer system determines if the CD-ROM is an audio CD-ROM. If the CD-ROM present is not an audio CD-ROM, the computer system proceeds to step 310 and displays the battery gauge status before ending the process in step 312. If the CD-ROM present is an audio CD-ROM, the computer system proceeds to step 305 to determine if the audio CD-ROM is being played. If the audio CD-ROM is not being played, the computer system again proceeds to step 310 and displays the battery gauge status before ending the process in step 312. If the audio CD-ROM is being played, then the computer system displays the track number in step 306 if the track number has changed since previously displayed. The track number is displayed by sending a command and the current track number being played to the keyboard controller 46, which updates the number on the display. The process ends with step 312.

Referring to FIG. 4, an isometric view of the portable computer case C that contains the computer system S in an open state is shown. Since a conventional CD-ROM drive application was dependent upon an operating system, it was necessary to use a conventional display screen to visually indicate to a user when a CD-ROM drive application was being operated. As such, portable computer users have been required to maintain a portable computer case containing a portable computer in an open state (with the mini LCD visible) to indicate the status of a conventional CD-ROM drive application to the user.

In contrast, with the present invention, whether the portable computer case C is maintained in a closed state or open state, a user is capable of determining when a computer system S is in a secondary operational mode, such as a mode for playing audio CDs in a CD-ROM drive independent of an operating system. Further, the user is able to readily ascertain track information. The portable computer case C includes a top shell 404 housing a main display screen 406 along with other components and a bottom shell 408 housing a keyboard 48 along with other components. The portable computer S of the present invention includes a status indicator 57 for indicating when the computer system S is in a secondary operational mode and a track indicator 61 for indicating which track of the audio CD is being played in the CD-ROM drive 28. The status indicator 57 and track indicator 61 (FIGS. 4–6) are provided on the top surface 410 of the bottom shell 408 of the portable computer case C.

Figure 5:
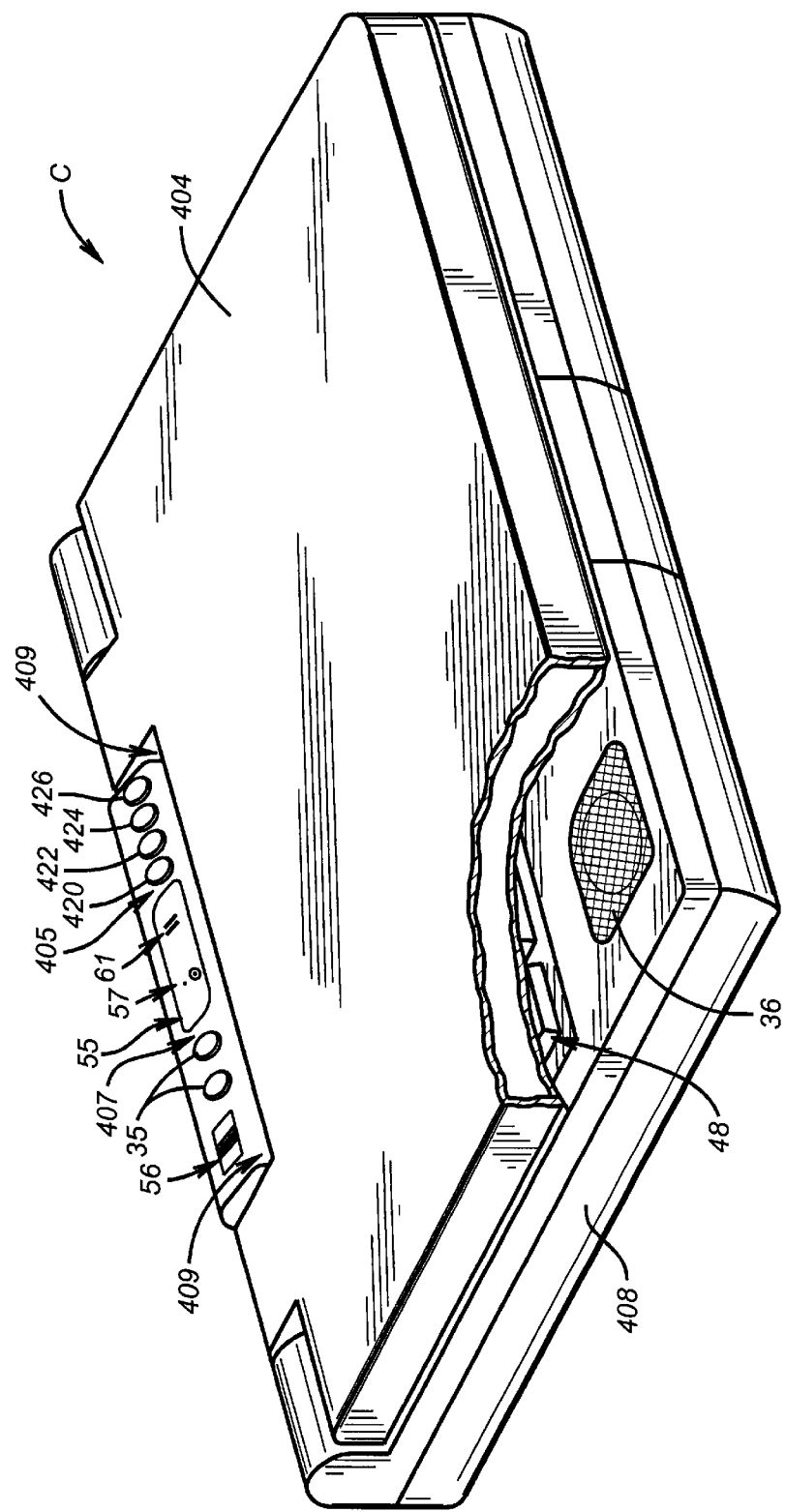
FIG. 5 is an isometric view of the portable computer case of FIG. 4 in a closed state in accordance with the present invention.

In the preferred embodiment, the status indicator 57 and track indicator 61 are provided near the rear side edge 412 of the bottom shell 408 at a location near the bottom or rear side edge 414 of the top shell 404. The location of the status indicator 57, track indicator 61, and other control switches and indicators on bottom shell 408 is preferably at or near an area 409 where the bottom shell 408 and top shell 404 are pivotally connected to each other to open and close the case C. The edge 414 of top shell 404 is recessed or removed at a central portion 405 in the area 407 to permit viewing of the status indicator 57 and track indicator 61 whether the case C is open (FIG. 4) or closed (FIG. 5). Also, the status indicator 57 and track indicator 61 are preferably provided on an upwardly angled or ramp portion 400 of the top surface 410 so that the status indicator 57 and track indicator 61 may be easily seen by a user. It should be understood, however, that other locations on the bottom shell 408 which provide convenient viewing for a user might be used, and precise placement is not considered critical to the invention.

For a computer system S capable of playing audio CDs in a CD-ROM drive 28 independent of an operating system, the track indicator 61 is preferably a number ranging from 1–20. The track indicator 61 is provided to the user on the mini status display screen 55, which is preferably of a liquid crystal composition. When the computer system S is in an audio CD mode, a pixel pattern corresponding to the track indicator 61 value is displayed on the status display screen 55. The track indicator is preferably updated at a 500 msec interval. However, this is illustrative of the disclosed embodiment and the techniques of the present invention could be implemented with a wide variety of indicators and could be updated at a variety of intervals.

Figure 6:
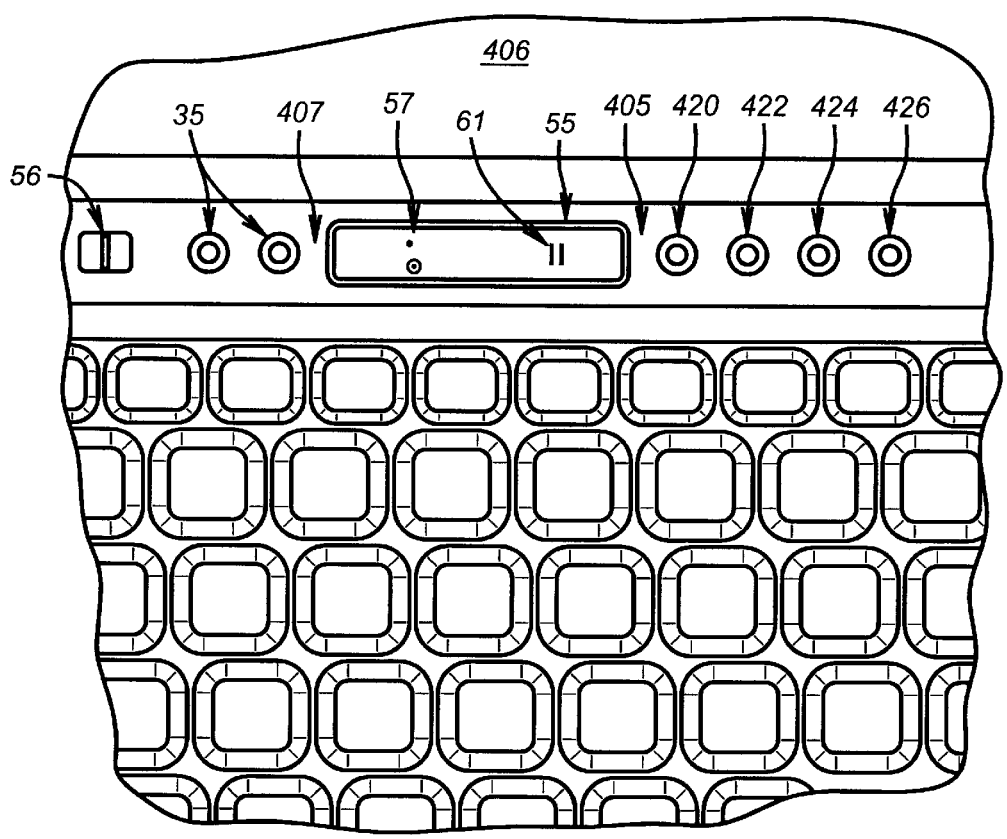
FIG. 6 is an enlarged plan view illustrating the portion of the top surface of the bottom shell of the portable computer case of FIG. 4 circled and having the numeral "6" designating same.

When the computer system S is in an audio CD mode, a number corresponding to the track is displayed on the status display screen 55. When the computer system S is in a primary operational mode, the track indicator 61 is not displayed on the status display screen 55. Thus, the track indicator 61 serves as a visual cue to the user. It should be understood that the track indicator 61 alternatively may include track numbers for indicating a secondary operational mode and battery charge status when in a primary operational mode. A battery charge status display is disclosed in U.S. patent entitled "REAL-TIME BATTERY GAUGE DISPLAY," incorporated by reference above. An enlarged view of a portion of the top surface 410 of bottom shell 408 of the portable computer case C is shown in FIG. 6. Thus, it can be seen that the status display screen 55 displaying the track indicator 61 is visible to the user whether the computer case C is open (FIG. 4) or closed (FIG. 5).

The master volume control buttons 35 (FIGS. 1, 4, 5, and 6) are preferably located on the top surface 410 of the bottom shell 408 of the portable computer case C at or near the locations described above for the status indicator 57. In this way, a user is capable of adjusting volume control with buttons 35 during a secondary operational mode. This can be done without the need to open the portable computer case C to visualize on the main display screen 406 the CD mixer volume controls for the audio sources. Along with the status indicator 57 and master volume control buttons 35, other CD control buttons such as play/pause 420, stop 422, previous track 424, and next track 426 are similarly located on the top surface 410 of the bottom shell 408 of the portable computer case C.

The track indicator 61 and master volume control buttons 35, due to their location, are visible when the portable computer case C is closed (FIG. 5) as well as open (FIG. 4). The audio CD mode control switch DM_SW 56 is also provided on the top surface 410 of the bottom shell 408 such that the audio CD mode control switch DM_SW 56 is accessible to the user when the computer case C is in an open state or a closed state.

Figure 7:
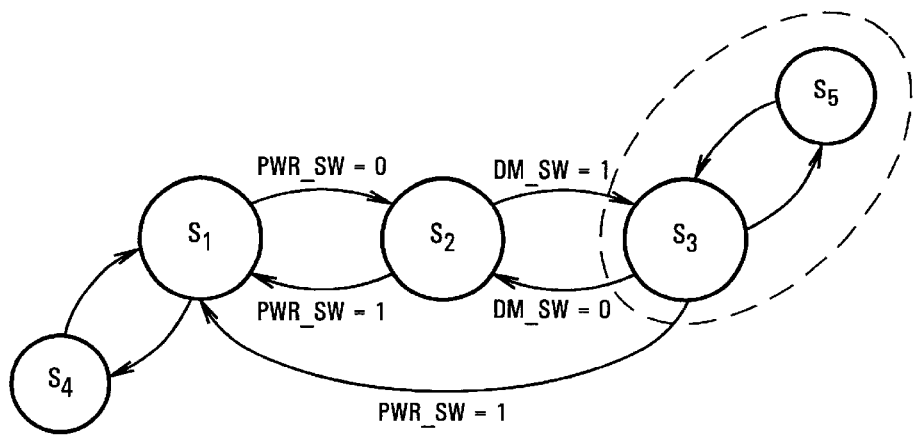
FIG. 7 is a state diagram of the power control states of the computer system of FIG. 1.

Referring to FIG. 7, a state diagram of the power control states of the portable computer system S is shown. The power control states are controlled by the keyboard controller 46 for the keyboard controller embodiment of the present invention. The $S_1$ state is the normal "on" power state of the computer system. The $S_1$ state corresponds to the power control switch PWR_SW 58 having a logical state of "1." In the $S_1$ state, the audio CD mode control switch DM_SW 56 for the secondary operational mode computer system is disabled such that toggling the switch DM_SW 56 has no effect. However, in the $S_2$ state, the audio CD mode control switch DM_SW 56 is enabled. When the power switch PWR_SW 58 is switched to a "0" logical state corresponding to an "off" power state, the system is placed in the $S_2$ power control state. An example of a power control mode corresponding to the $S_2$ power control state is a hibernate mode of the computer system S.

In the $S_2$ state, when the audio CD mode control switch DM_SW 56 is switched to a "1" logical state, the computer system S is placed in the $S_3$ power control state. The $S_3$ power control state corresponds to the normal power state for a secondary operational mode of a computer system S such as a mode for playing audio CDs in a CD-ROM drive independent of an operating system. In the $S_3$ power state, the processor 10 clock performs at full speed.

Alternatively, the $S_3$ power state can be omitted, and a power state throttling down the processor 10 to the lowest useful speed can be implemented. This power state uses the lowest useful processor speed to conserve energy when a full speed processor 10 is not needed.

After power up of a secondary operation mode of the computer system S the audio CD code places the computer system S in the $S_5$ power state using logic in the PCI-ISA bridge 24. The audio CD code also places the computer system S in the $S_5$ power state after a CD button selection is processed. However, when a CD bezel button is being processed, the audio CD code places the computer system S in the $S_3$ power control state. The $S_5$ power state is a power-on-suspend (POS) mode in which the processor 10 clock is stopped.

While the computer system S is in an audio CD mode, the system S is in either the $S_3$ power state or the $S_5$ power state. From the $S_3$ state, toggling the audio CD mode control switch DM_SW 56 to a logical state of "0" returns the computer system to the $S_2$ state. Also, from the $S_3$ state, toggling the power control switch PWR_SW 58 to a logical state of "1" places the computer system S in the $S_1$ state. From the $S_1$ state, the computer system S may also be placed in an $S_4$ state such as the sleep mode of the computer system S. In the sleep mode of the computer system S, the audio CD mode control switch DM_SW 56 is disabled.

Figure 8:
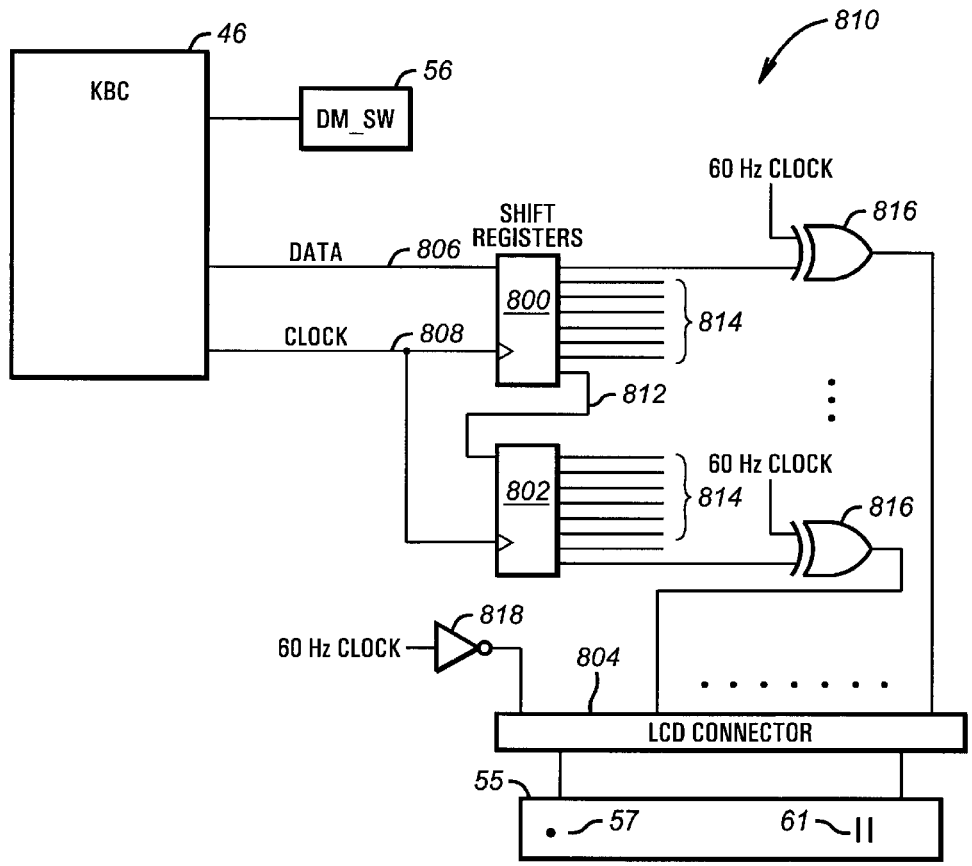
FIG. 8 is a schematic electrical circuit diagram of mini status display screen control circuitry in accordance with the present invention.

Referring to FIG. 8, a schematic diagram of the mini status display screen control circuitry 810 of the present invention is shown. The control circuitry 810 is coupled between the keyboard controller 46 and the mini status display screen 55. The keyboard controller 46 is coupled to the audio CD mode switch DM_SW 56 so that the keyboard controller 46 may detect the status of the audio CD mode switch DM SW 56. Based on the status of the audio CD mode switch DM_SW 56 and other information provided to the keyboard controller 46, the keyboard controller 46 provides a plurality of control signals to the mini status display screen 55.

In particular, the keyboard controller 46 generates a data signal 806 communicated to the data input of serial-in, parallel-out shift register 800. The keyboard controller 46 also generates a clock signal 808 that is provided to the clock inputs of shift registers 800 and 802. One of the output state signals 812 of shift register 800 is provided as an input to shift register 802. The other output state lines 814 of the shift registers 800 and 802 are provided to the mini status display screen 55 through an LCD connector 804 to generate separate activation signals for segments of the mini status display screen 55. In operation, data is clocked into the shift registers 800 and 802 by the clock signal 808, and is thereby converted to parallel data. By using the keyboard controller 86 to generate a data signal 806 and a clock signal 808, only two pins from the keyboard controller 46 need to be dedicated to the operation of the mini status display screen 55.

A plurality of the segments correspond to the portion of the mini status display screen 55 for displaying the track indicator 61. Other segments may be used for displaying other status indicators such as a battery gauge indicator. Preferably, each of the output state lines 814 of the shift registers 800 and 802 to be provided to the mini status display screen 55 are intermittently illuminated. This may be done by modulating the status lines 814 with a 60 Hz clock, preferably by using exclusive-OR gates 816. The outputs of the exclusive-OR gates 816 are thus referenced sixty times a second. The outputs of the LCD connector 804 are also modulated with an inverted version of the 60 Hz clock signal through an inverter 818. This modulation prevents damage to the elements of the mini status display screen 55.

Figure 9:
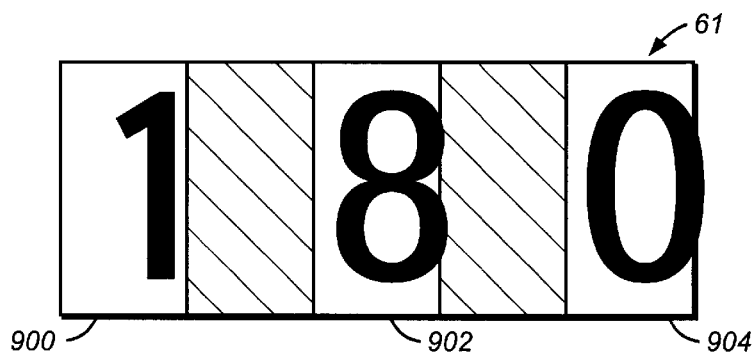
FIG. 9 is a diagram of the track indicator of FIG. 1 in accordance with the present invention.

Turning now to FIG. 9, an enlarged view of the track indicator 61 is shown. The track indicator 61 contains three digit areas, a ONE digit 900, an X digit 902, and a ZERO digit 904. The disclosed embodiment shows that track numbers 1 through 20 can be displayed when an audio disk is being played and that the three digit areas can be utilized to display the battery gauge status, including status in a percent form, when an audio disk is not being played. To accomplish this, the three digit areas are selectively used to display the proper track number. The ONE digit 900 either displays a "1" or it is blanked. The ONE digit 900 displays a "1" when the track number is 10 through 19 and the ONE digit is blanked when the track numbers is 1 through 9 or 20. The ZERO digit 904 displays a "0" or it is blanked. The ZERO digit displays a "0" when the track number is 20, else the ZERO digit 904 is blanked. The X digit 902 displays the numbers 0 through 9. The X digit 902 corresponds to the track number when the track number is 1–9. When the track number is 10–19, the X digit 902 displays 0 through 9, corresponding to the second digit in the track number. Therefore, if track 13 is being played, then the ONE digit 900 displays a "1" and the X digit 902 displays a "3". When the track number is 20, the X digit 902 displays a "2". Therefore, if track 20 is being played, then the X digit 902 displays a "2" and the ZERO digit 904 displays a "0". While displaying the track number using this system illustrative of the disclosed embodiment, display techniques according to the invention could be implemented by a wide variety of other displays.

Thus, in a computer system according to the invention a user is capable of viewing a track indicator 61, status indicator 57, and accessing master volume control buttons 35 and a control switch 56 for a secondary operational mode when the computer case is in either an open state or a closed state. A user, therefore, is not required to maintain the case in an open state to determine current track information, and the computer system is capable of functioning more like a consumer audio CD player.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

We claim:

1. An apparatus, comprising:
   a case housing a disk drive for receiving a playback disk, the case comprising:
   a top shell for housing a main display screen;
   a bottom shell coupled to the top shell, the top shell being movable between an open position and a closed position relative to the bottom shell; and
   a status display provided on the top surface of the bottom shell to be visible to a user when the ton shell is in a closed position;
   a means for reading a track number of an audio CD during an audio CD play mode of a computer system; and
   a means for providing the track number to a status display of the computer system during the audio CD play mode,
   wherein the audio CD play mode comprises a reduced power mode of the computer system.

2. The apparatus of claim 1, wherein the audio CD play mode comprises a secondary operational mode of the computer system.

3. The apparatus of claim 2, including a CD ROM drive application operable in the secondary operational mode independently of an operating system for controlling a primary operational mode of the computer system, to permit playing of audio CDs but not of data CDs.

4. The apparatus of claim 1, wherein the status display comprises a liquid crystal display integrated within the computer system.

5. The apparatus of claim 4, wherein the liquid crystal display comprises a mini liquid crystal display.

6. The apparatus of claim 1, wherein the status display is separate from a main display of the computer system.

7. The apparatus of claim 1, wherein the audio CD play mode comprises a secondary operational mode of the computer system.

8. The apparatus of claim 1, wherein the case includes a recessed portion to expose the status display when the case is in a closed position.

9. An apparatus, comprising:
   a case housing a disk drive for receiving an audio playback disk, the case comprising:
   a top shell for housing a main display screen;
   a bottom shell coupled to the top shell, the top shell being movable between an open position and a closed position relative to the bottom shell; and
   a status display provided on the top surface of the bottom shell, said status display being visible to a user when the top shell is in an open position and when the top shell is in a closed position;
   a means for reading a track identifier of an audio playback disk during a disk playback mode of a system; and
   a means for providing the track identifier to the status display during the disk playback mode,
   wherein the disk playback mode comprises a reduced power mode of the system.

10. The apparatus of claim 9, wherein the status display protrudes through an opening in the top shell when the top shell is in the closed position.

11. The apparatus of claim 9, wherein the status display is located near an edge of the top surface of the bottom shell and is exposed by a recessed edge of the top shell when the top shell is in the closed position.

12. The apparatus of claim 9, wherein the status display comprises a multi-segment display and said track identifier is displayed by activated segments of the display.

13. The apparatus of claim 9, wherein when the top shell is in the closed position, a viewing surface of the status display is inclined to the outer surface of the top shell.

14. An apparatus, comprising:
a case housing a disk drive for receiving an audio playback disk;
a main display screen mounted at an interior region of the case; and
a status display provided on an interior surface of the case to be visible to a user when the case is in an open position and when the case is in a closed position;
a means for reading a track identifier of an audio playback disk during a disk playback mode of a system; and
a means for providing the track identifier to the status display during the disk playback mode,
wherein the disk playback mode comprises a reduced power mode of the system.

15. The apparatus of claim 14, wherein the top shell and the bottom shell of the case are pivotally coupled and wherein the status display is located on a top surface of the bottom shell.

16. The apparatus of claim 15, wherein the status display is exposed through an edge recess in the top shell when the case is in a closed position.

17. The apparatus of claim 14, wherein the case includes a recessed edge portion to expose the status display when the case is in a closed position.

18. The apparatus of claim 14, wherein the status display comprises a multi-segment display and said track identifier is displayed by activated segments of the display.

19. The apparatus of claim 14, wherein when the top shell is in the closed position, a viewing surface of the status display is inclined to the outer surface of the top shell.

20. An apparatus, comprising:
a case comprising top and bottom shells and housing a disk drive for receiving an audio playback disk;
the top shell housing a main display screen;
the bottom shell pivotally coupled to the top shell at or near a rear edge of the case for pivotal movement of the top shell to move a front edge of the top shell relative to the bottom shell between open and closed positions of the case;
the bottom shell including a top surface on which a multi-element status display is provided adjacent said rear edge of the case;
the top shell including a recessed rear edge portion to expose the status display when the case is in a closed position;
a means for reading a track identifier of a playback disk during an audio disk playback mode of a system; and
a means for selectively activating elements of the multi-element status display to display the track identifier during the audio disk playback mode,
wherein the audio disk playback mode comprises a reduced power mode of the system.

21. The apparatus of claim 20 wherein the disk drive comprises an audio CD drive.

22. The apparatus of claim 20, wherein the status display protrudes through the top shell in a closed position of the case.

* * * * *